United States Patent [19]
Breuer et al.

[11] 3,857,760
[45] Dec. 31, 1974

[54] PROCESS OF MEASURING THE CONCENTRATION OF A DISSOCIATABLE COMPONENT IN A GAS AND APPARATUS THEREFOR

[75] Inventors: Wolfram Breuer; Jacques Deprez; Burthold Sturm, all of Leverkusen, Germany

[73] Assignee: Bayer Aktiengesellschaft, Leverkusen, Germany

[22] Filed: June 16, 1971

[21] Appl. No.: 153,783

Related U.S. Application Data
[63] Continuation-in-part of Ser. No. 836,007, June 24, 1969, abandoned.

[30] Foreign Application Priority Data
July 8, 1968 Germany............................ 1773795

[52] U.S. Cl................ 204/1 T, 136/153, 204/195 S
[51] Int. Cl...................... G01n 27/30, G01n 27/46
[58] Field of Search.......... 204/1 T, 195 S; 136/153, 136/86 E, 86 R; 324/29; 252/62.2

[56] References Cited
UNITED STATES PATENTS
| | | | |
|---|---|---|---|
| 2,913,511 | 11/1959 | Grubb.................................. | 136/86 |
| 3,493,484 | 2/1970 | Berg et al. .......................... | 204/195 |
| 3,541,124 | 11/1970 | Owens .......................... | 252/62.2 X |

Primary Examiner—G. L. Kaplan
Attorney, Agent, or Firm—Burgess, Dinklage & Sprung

[57] ABSTRACT

In the measuring of a component of a gas stream in a measuring cell similar to a Nernst concentration cell with the gas stream being conducted past and in contact with the electrolyte and one of the electrodes, the electrolyte essentially comprises a solid, organic material of low vapor pressure, such as a mixture of benzoic acid and propylene carbonate.

30 Claims, 1 Drawing Figure

PATENTED DEC 31 1974　　　　　　3,857,760
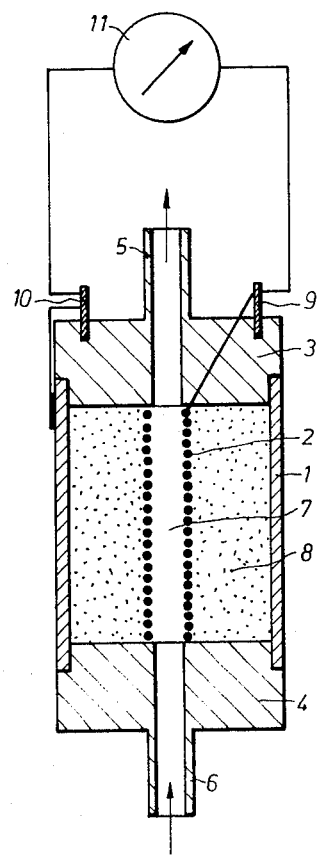
INVENTORS:
WOLFRAM BREUER, JAQUES DEPREZ, BERTOLD STURM.
BY
Burgess, Dinklage & Sprung

PROCESS OF MEASURING THE CONCENTRATION OF A DISSOCIATABLE COMPONENT IN A GAS AND APPARATUS THEREFOR

This application is a continuation-in-part of application Ser. No. 836,007, filed June 24, 1969, now abandoned.

The invention relates to an analysis instrument for measuring gas concentration with measuring cell similar to a Nernst concentration cell, the gas stream to be investigated being conducted past one of the two electrodes of the measuring cell, which are both in contact with an electrolyte and are connected to one another with low resistance in the outer closing circuit.

It is known to measure concentration of one or more gas components in a gas stream by conducting this gas stream past one of two electrodes, which are both wetted with an electrolyte and are separated from one another by a barrier in the form of a diaphragm arranged in the electrolyte. The gas components to be measured produce on one of the electrodes an alteration in the local ion concentration and thus, as in a Nernst concentration cell, a measurable electric current flows in an outer electric closing circuit between two electrodes.

Low-resistance current measurements - perhaps below 10 kiloohm- in the outer closing circuit have the advantage, as compared with high resistance potential measurement, that the measuring current increases linearly with the concentration of the gas components to be measured and that there is a definite zero point.

An important factor as regard the low-resistance current measurement is the nature of the barrier which is arranged between the electrodes in the electrolyte and which prevents an immediate mixing of the ions in the electrolyte. This barrier must itself be of the lowest possible resistance and must not change its electrical or mechanical properties during the measurments.

it is known that narrow-pored, porous bodies which are impregnated with liquid electrolytes which completely fill the electrode interstices have the necessary barrier effect and, for some applications, offer great advantages as compared with thin membranes and diaphragms.

A disadvantage with automatic gas analyses with such systems containing liquid electrolytes is the fact that the vapor pressure of the electrolytes being used cannot be disregarded; this pressure causes a loss of water or an absorption of water, for example, with aqueous electrolytes by exchange with the measuring gas stream and thus results in a concentration or dilution of the electrolytes, and represents an important loss of material in other systems.

It has now been found that these disadvantages are avoided and a measuring cell of very simple construction is provided for continuous measurement if, according to the invention, the electrolyte consists of one or more organic substances which are matched to one another and is of solid consistency. In one particular embodiment of the invention, the electrolyte has a vapor pressure of less than 1 mm. Hg. at 60°C., a dielectric constant of more than 20, preferably more than 30 or 40, or a dipole moment of more than 2.0 Debye preferably more than 3, and a specific resistivity of less than $10^5$ ohm.cm. preferably less than $10^6$. An electrolyte with these properties displays a very good behavior and permits satisfactory measurements.

The low vapor pressure prevents an appreciable loss of material and permits the system to be used without disruption for continuous measurement. The high dielectric constant or the large dipole moment enable the substance to dissociate the chemical reactants and thus to take over the function of an electrolyte. Due to the solid consistency a rapid ion exchange within the electrolyte is prevented, while the advantageous low-resistance current measurement is made possible by the low internal resistance.

More particularly, for the electrolyte, we use mixtures of different organic substances. One substance is used as carrier material, the other represents a solvent. The carrier material forms the solid structure of the electrolyte after the solidification of the mixture from a melt and is partly solved by the solvent. The electrical conductivity is improved therewith and the carrier materials used by us show a better transport of for example $H+$-ions over the hydrogen bridges. In the solvent the chemical reactions occur. In the solvent, the components to be measured are solved, dissociated and transformed. By the appearance of electromotoric forces the ions are conveyed to the electrodes.

We have tested the following substances in nearly all combinations and proportions:

1. Carrier substances: Benzoic acid, its derivates and salts as sodium benzoate; tuluic acid, crotonic acid, salicyclic acid and their salts e.g. sodium salts.
2. Solvents: Ethylene Glycol (Dielectric constant 41, Boiling point 200°C) Glycerol (D.C. 56 B.P. 300°C), propylene carbonate (D.C. 64, B.P. 270°C), Butylene Carbonate (B.P. 300°C). A large number of other organic substances as carrier and solvents can be used.

The advantage of the organic electrolyte, by suitable choice of components, is their low vapor pressure. Therewith escape of substance by vaporizing is avoided and the systems have a long life time. Aqueous systems generally show high escape of water by vaporizing so that aqueous systems are not usable.

In general the carrier material should be solid at normal temperature having neglagable vapor pressure, and be compatible with the solvent for the functioning of the cell in known manner for concentration cells. The solvent, in general should be an organic material having a dielectric constant of more than 20, preferably more than 30, better more than 40, or a dipole moment of more than 2.0 Debye, preferably more than 2.5 or 3, and a boiling point of more than 150°C, preferably more than about 200°C, and a vapor pressure of less than 1 mm Hg. at 60°C.

While the gas component to be measured can best be ionizable, that is not necessary; it need merely be such that measurable dissociation of the gas component occurs so that there is appearance of electromotive force. The electrolyte and the gas component must be compatible for such operation.

An electrolyte consisting of a mixture of benzoic acid (about 50 to 70 parts by weight) and propylene carbonate (about 50 to 30 parts by weight) has proved especially suitable.

These substances offer as a great advantage the possibility of producing in simple manner dimensionally stable, self-supporting measurement cells which are resistant to impact and vibration and are independent of position, and can be used for gas analysis in continuous operation without maintenance.

For example, a measuring cell with an electrolyte consisting of a mixture of 60 parts by weight of benzoic acid and 40 parts by weight of propylene carbonate (1), i.e. 4-methyl-1,3-dioxolan-2-one

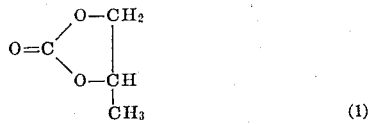

(1)

which is melted at 120°C. and then poured into a suitable mould, permits in combination with silver as the electrode material the measurement of hydrogen sulphide in gases.

The use of such a measuring cell in an analysis instrument is explained by reference to one constructional example.

DRAWING

The drawing is a schematic illustration of one type of measuring cell according to this invention, and more fully described in the following example.

EXAMPLE

A casing tube 1 serving as counter-electrode and consists of a selected electrode material. It is closed top and bottom by plugs 3 and 4 of non-conducting material which are each provided with a central gas passage 5 and 6. The interior of the casing tube 1 is filled up to an axial, cylindrical cavity 7, which preferably has the same diameter as the gas passages, with an organic solid electrolyte 8. Embedded in the boundary surface of the organic solid electrolyte 8 with the cavity 7 is a helically wound measuring electrode 2, which is led through the plug 3 to an electrical connection 9. The casing tube 1 is conductively connected to a connection 10.

The gas stream to be investigated enters through the gas passage 6, passes through the cavity 7 and leaves the cell through the gas passage 5. The gas component to be detected reacts in the surface of the organic electrolyte 8 and alters the local ion concentration. The alteration produces a measureable electric current at 11 in the low-resistance outer closing circuit between the connections 9 and 10.

The electrolyte can be the benzoic acid, propylene carbonate mixture particularly described above. The electrode 1 and 2 can each be silver or can each be another suitable metal. The electrodes can be the same or different. They should be resistant to attack by the electrolyte.

What is claimed is:

1. An electrolytic cell instrument adapted to measure the concentration of a dissociatable component of a gas, operating on the principle of a Nernst concentration cell, consisting essentially of two electrodes, an electrolyte disposed in said cell between and in contact with said electrodes, and comprising means for passing the gas into contact with the electrolyte so that the gas can be dissociated, said electrolyte being an organic substance of solid consistency and being a non-aqueous system, for contacting of the gas with the organic electrolyte for dissociation of said gas component in the organic electrolyte to an extent proportional to the concentration of the dissociatable component in the gas for generation of an electromotive force to an extent proportional to the concentration of the dissociatable component in the gas and means adapted to connect said electrodes and measure the electromotive force as a measure of the dissociatable component in the gas.

2. The instrument of claim 1, the electrolyte consisting essentially of a mixture of a carrier forming the solid structure of the electrolyte and being an organic substance, and an organic solvent for solving and dissociation of said component.

3. The instrument of claim 2, the carrier being benzoic acid, tuluic acid, crotonic acid, salicylic acid or a salt of one of said acids, the solvent being ethylene glycol, glycerol, propylene carbonate, or butylene carbonate.

4. The instrument of claim 3, wherein the carrier is benzoic acid and the solvent is propylene carbonate.

5. The instrument of claim 4, the proportion of carrier and solvent being 50 to 70 parts by weight benozic acid carrier and 50 to 30 parts by weight propylene carbonate solvent.

6. The instrument of claim 2, the electrolyte having a vapor pressure of less than 1 mm at 60°C.

7. The instrument of claim 6, said measuring means being for measuring the current flow between said electrodes.

8. The instrument according to claim 2, said electrolyte having a vapor pressure of less than 1 mm Hg at 60°C, and the means adapted to connect the electrodes comprising circuit having a resistance below 10 kiloohms.

9. The instrument according to claim 8, the electrolyte having a dielectric constant of more than 20 or a dipole moment of more than 2.0 Debye and a specific resistivity less than $10^5$ ohm-cm.

10. The instrument of claim 1 wherein said electrolyte has a vapor pressure less than 1 mm Hg at 60°C, a dielectric constant of more than 20 or a dipole moment of more than 2.0 Debye and a specific resistivity less than $10^5$ ohm-cm.

11. The instrument of claim 10, the electrolyte consisting essentially of a mixture of a carrier forming the solid structure of the electrolyte and being an organic substance, and an organic solvent for solving of said gas component.

12. The instrument of claim 11, the carrier being benzoic acid, tuluic acid, crotonic acid, salicylic acid or a salt of one of said acids, the solvent being ethylene glycol, glycerol, propylene carbonate, or butylene carbonate.

13. The instrument of claim 10 wherein said electrolyte consists essentially of in the range of 50 to 70 parts by weight of benzoic acid and 50 to 30 parts by weight of propylene carbonate (4-methyl-1,3-dioxolan-2-one).

14. The instrument of claim 1, said measuring means being for measuring the current flow between said electrodes.

15. The instrument of claim 14, said electrolyte having a vapor pressure of less than 1 mm Hg. at 60°C.

16. The instrument of claim 1, the electrolyte having a vapor pressure of less than 1 mm at 60°C.

17. The instrument according to claim 1, wherein said electrolyte has a vapor pressure less than 1 mm Hg at 60°C, a dielectric constant of more than 30 or a dipole moment of more than 3 Debye and a specific resistivity less than $10^6$ ohm-cm.

18. The instrument according to claim 1, said electrolyte being enclosed within a container having an inlet opening and an outlet opening, and a passageway through the cell communicating with said inlet opening and outlet opening for passage of a stream of said gas through the cell and for contacting of the gas with the electrolyte upon passage thereof through the cell.

19. The instrument according to claim 1, the electrodes and organic electrolyte being the only means of the instrument for generation of electromotive force.

20. The instrument according to claim 1, the means adapted to connect the electrodes comprising a circuit having a resistance below 10 kiloohms.

21. The instrument according to claim 1, said electrolyte having a vapor pressure of less than 1 mm Hg at 60°C, and the means adapted to connect the electrodes comprising a circuit having a resistance below 10 kiloohms.

22. The instrument according to claim 1, the electrolyte having a dielectric constant of more than 20 or a dipole moment of more than 2.0 Debye and a specific resistivity less than $10^5$ ohm-cm.

23. Process of measuring the concentration of a dissociable component in a gas which comprises contacting the gas with the electrolyte of an electrolytic cell according to claim 1 for dissociating of said gas component in the electrolyte to an extent proportional to the concentration of the dissociable component in the gas for generation of an electromotive force to an extent proportional to the concentration of the dissociable component in the gas, and measuring said electromotive force as a measure of the dissociable component in the gas.

24. Process according to claim 23, the electrolyte consisting essentially of a mixture of a carrier forming the solid structure of the electrolyte and being an organic substance, and an organic solvent for solving and dissociation of said gas component.

25. Process according to claim 24, said electrolyte having a vapor pressure of less than 1 mm Hg. at 60°C.

26. Process according to claim 25, wherein said electromotive force is measured by measuring current generated thereby.

27. Process according to claim 23, wherein said electromotive force is measured by measuring current generated thereby.

28. Process according to claim 23, said electrolyte having a vapor pressure of less than 1 mm Hg. at 60°C.

29. Process according to claim 23, the electrodes and organic electrolyte being the only means of the instrument for generation of electromotive force.

30. Process according to claim 23, the means adapted to connect the electrodes comprising a circuit having a resistance below 10 kiloohms.

* * * * *

UNITED STATES PATENT OFFICE
CERTIFICATE OF CORRECTION

Patent No. 3,857,760      Dated December 31, 1974

Inventor(s) Wolfram Breuer, Jacques Deprez, Berthold Sturm

It is certified that error appears in the above-identified patent and that said Letters Patent are hereby corrected as shown below:

Column 5, line 16 (claim 22, line 1) change "claim 1," to --claim 21,--.

Signed and Sealed this ninth Day of March 1976

[SEAL]

Attest:

RUTH C. MASON
Attesting Officer

C. MARSHALL DANN
Commissioner of Patents and Trademarks